June 1, 1926.
A. D. HOWRY
1,586,744
METHOD OF REVERSING POLARITY OF SYNCHRONOUS CONVERTERS
Filed August 12, 1922
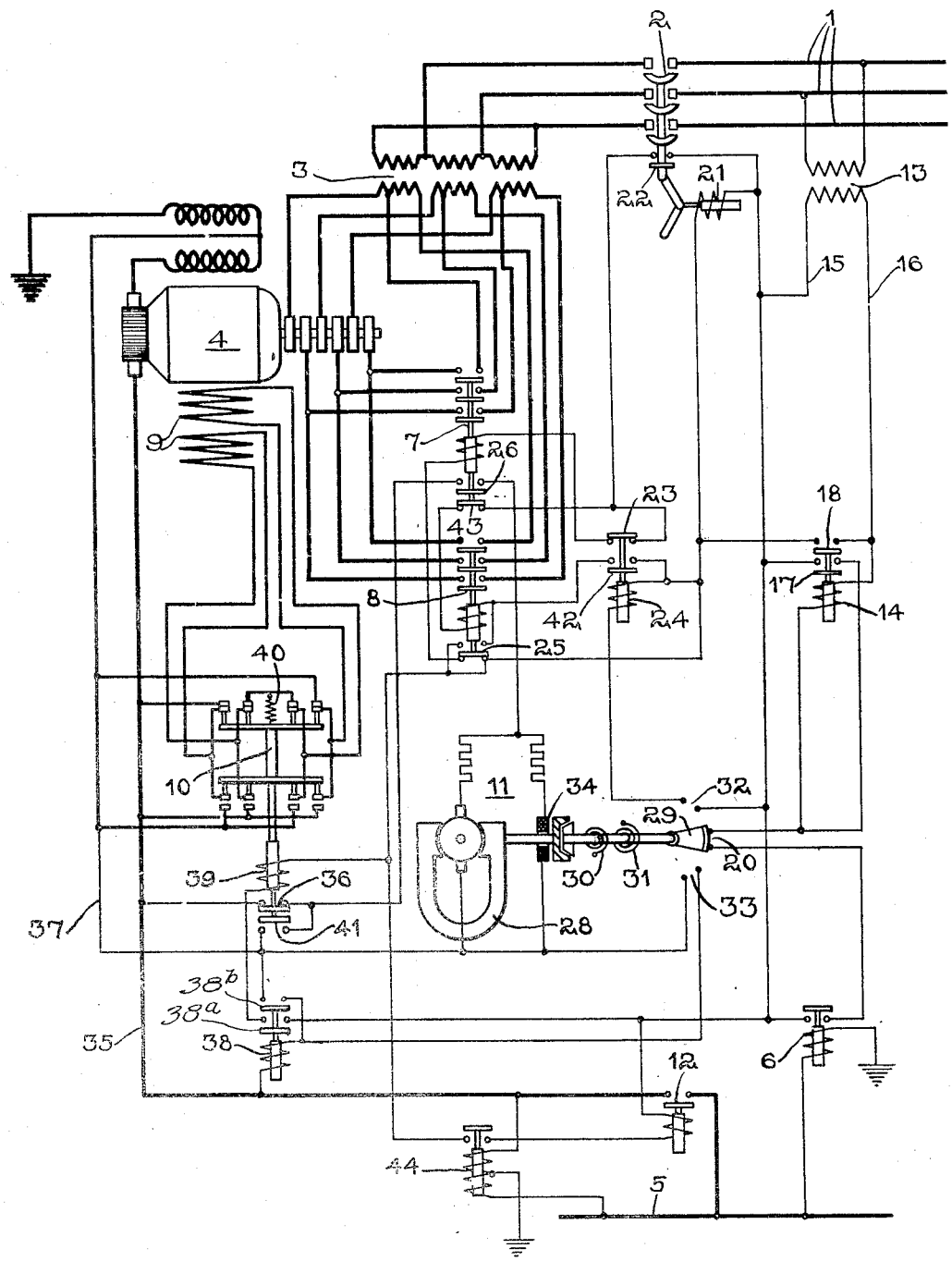
WITNESSES:
INVENTOR
Aaron D. Howry.
BY
ATTORNEY Patented June 1, 1926.

1,586,744

UNITED STATES PATENT OFFICE.

AARON D. HOWRY, OF LANCASTER, PENNSYLVANIA, ASSIGNOR TO WESTINGHOUSE ELECTRIC & MANUFACTURING COMPANY, A CORPORATION OF PENNSYLVANIA.

METHOD OF REVERSING POLARITY OF SYNCHRONOUS CONVERTERS.

Application filed August 12, 1922. Serial No. 581,314.

My invention relates to automatic stations and particularly to automatic substations in which a synchronous converter is employed to convert alternating current to direct current.

One object of my invention is to provide a system whereby a predetermined polarity may be automatically developed in a self-starting synchronous converter.

Another object of my invention is to provide a system of the above-indicated character, in which the polarity of the converter is controlled by controlling the direction of excitation of the shunt field winding from the commutator brushes of the converter.

A further object of my invention is to provide a system, of the above-indicated character, in which a chance polarity other than a predetermined polarity, developed in the converter during starting operation, may be easily reversed in a machine, the field magnet pole members of which have strong magnetic remanent characteristics.

A further object of my invention is to provide a system of the character described that shall be automatic, effective and reliable in its operation.

Patent No. 1,435,229, electrical system, issued Nov. 14, 1922 to Frederic C. Hanker and Charles McL. Moss, describes a system in which a synchronous converter is employed to translate alternating current energy into direct current energy. A predetermined polarity is developed in the converter, that corresponds to the polarity of the direct-current circuit, by controlling the direction of excitation of the shunt field winding from the commutator of the converter by reversing such connections when the chance polarity developed in the converter is other than the predetermined polarity.

In applying control apparatus to automatically-controlled synchronous converters of modern type, no difficulty is encountered in reversing the excitation of the field pole members by reversing the connections of the shunt field winding as a unit to the commutator. Where, however, control apparatus is applied to synchronous converters of the former type that are provided with solid field magnet pole members, the reversing magnetic effect that is developed by the shunt field winding when connected to the commutator in the reverse manner is unsufficient to counterbalance and reverse the magnetic excitation of the field magnet pole members. By dividing the shunt field winding into a plurality of portions and connecting such portions in parallel relation to the commutator of the converter, however, sufficient reversing magnetic effect may be obtained to reverse the excitation of the pole members.

In practicing my invention, I therefore provide a field switch that is adapted, in its normal position, to connect the shunt field winding to the commutator of the converter with all of the portions of the winding in series. When it is necessary to reverse the excitation of the field pole members because of incorrect polarity, the several portions of the winding are connected in parallel relation relative to each other across the brushes of the commutator. By means of the greater degree of excitation that is thus obtained, the excitation of the most strongly magnetically retentive field magnet pole members may be reversed.

The single figure of the accompanying drawing is a diagrammatic view of an electrical system including the switching arrangement embodying my invention.

In the system that is illustrated, energy is received from an alternating circuit 1 through a main switching device, or circuit interrupter, 2 and a plurality of power transformers 3, and then translated by a synchronous converter 4 to direct-current energy which is supplied to a direct-current circuit 5, such as a trolley circuit.

In order that the synchronous converter may be employed to translate energy only when there is a demand for energy upon the immediate trolley section or circuit 5 that is supplied by the converter, a voltage relay 6 is provided which closes a switch when the voltage of the circuit 5 decreases to, or below, a predetermined value indicating a predetermined demand on the circuit for energy.

When the voltage relay 6 is permitted to close its switch, auxiliary relay devices and control circuits are energized to connect the power transformer 3 to the alternating-current circuit 1 and then to close a starting switch 7 whereby a relatively small electromotive force is applied to the converter to start and accelerate it to synchronous speed.

During the starting operation, the excitation of the field winding of the converter is so controlled as to effect the development of a predetermined polarity, whereupon the starting switch 7 is opened and a running switch 8 closed which impresses normal operating electromotive force upon the converter to permit the translation of energy at full voltage.

The field winding 9 of the converter consists of two or more portions that are controlled by a transfer field switch 10 that normally connects the portions of the field winding in series and, when actuated to its reversing position, connects such portions of the field winding in parallel. The position of the field switch 10 is dependent upon the polarity that is developed in the converter and is controlled by a polarized relay 11 which is connected to the commutator of the converter and is responsive to the polarity developed therein.

When voltage of proper value is generated in the converter, the brushes are connected to the direct-current circuit by a switching device 12. In order to provide operating potential for the controlling relays, an auxiliary transformer 13 is employed that is connected to the circuit 1. A relay 14, known as the master relay, is employed to control the energization of the various relay devices.

When the voltage relay 6 closes by reason of the decrease in the voltage of the circuit 5, a circuit is completed thereby that connects the operating coil of the master relay 14 to the terminals 15 and 16 of the secondary of the transformer 13. The relay 14, when energized, closes its two switches 17 and 18.

The switch 17 is connected in parallel circuit relation with the switch of the relay 6 and a neutral position switch 20 of the polarized relay 11, and serves, when closed, to maintain the circuit of the operating coil of the relay 14 energized. The relay 14 will therefore remain energized, irrespective of subsequent fluctuations in the voltage of the circuit 5 which might open the switch of the voltage relay 6. It will be understood that the master relay 14 may be automatically de-energized in any suitable manner well known in the automatic substation art, when it is desired that operation of the converter 4 be stopped.

The switch 18, when closed, completes the circuit of the closing coil 21 of the main switching device 2 whereupon the transformers 3 are connected to the alternating-current circuit 1 to be energized therefrom. An auxiliary interlock switch 22 is closed when the main switch 2 is closed. Immediately upon closing, a circuit is completed by the auxiliary interlock switch 22 from the terminal 15 of the transformer 13 through a normally closed interlock switch 23 of a transfer relay 24, the operating coil of the starting switch 7, the back contacts of an interlock switch 25 of the running switch 8 and the switch 18 of the master relay 14 to the terminal 16 of the transformer 13. The starting switch 7 is thereupon closed to connect the converter windings to the starting taps of the transformer 3 to start the converter and accelerate it to synchronous speed.

When the converter is started and accelerated to synchronous speed, no definite polarity is established at the direct-current end of the converter until synchronous speed is attained. Polarity thereupon develops at random and such chance polarity may or may not be the polarity that corresponds to the polarity of the direct-current circuit and that will permit the direct connection of the converter to the circuit without the necessity of reversing switches. Because of the arrangement of apparatus in a station, it is desired that the same brushes of the converter always have the same polarity.

When the starting switch 7 closes, an auxiliary interlock switch 26 is closed that connects the polarized relay 11 across the brushes of the converter 4. The polarized relay 11 comprises a direct-current motor 28 preferably having permanently magnetized field pole members. The relay 11 further comprises three sets of stationary contact members and a movable bridging member 29 that is adapted to engage and bridge the contact members of the respective sets.

The bridging member 29 normally engages a set of contact members 20 and is maintained in such neutral position by two springs 30 and 31. The bridging member 29 is actuated to engage either of the other two sets 32 and 33 by means of the motor 28 through a magnetic clutch 34.

When the polarity of the converter is developed in the right direction corresponding to the predetermined polarity, the bridging member 29 is actuated to bridge the contact members 32. If, however, the polarity is developed in the reverse direction, the bridging member 29 is actuated to engage the contact members 33.

When the switch 26 of the starting switch closes, it connects the polarized relay across the converter brushes. This circuit may be traced from the converter brushes through positive conductor 35, a normally closed interlock switch 36 that is controlled by the field switch 10, interlock switch 26 of the starting switch 7, the polarized relay 11 and negative conductor 37 to the negative brushes of the converter.

It will be observed that the armature of the polarized relay 28 and the operating coil 34 of the magnetic clutch are connected in parallel relation so that both are simultaneously energized. If the relay should become de-energized, the clutch members would be released and the bridging member 29 would be moved back to its neutral position.

Let it be assumed that the converter has been accelerated to synchronous speed and that the chance polarity is the reverse of the desired polarity. The bridging member 29 will therefore be actuated to bridge the contact members 33, whereupon a circuit will be completed from the negative conductor 37 through the contact members 33 and the bridging member 29, and the operating coil of an auxiliary relay switch 38 to the positive conductor 35. The relay switch 38 thereupon closes two switches 38$^a$ and 38$^b$. The switch 38$^a$, when closed, connects the operating coil 39 of the field switch 10 across the terminals of the transformer 13 through the switch 18. The switch 38$^b$ is connected in parallel relation to the contact members 33 to complete a holding circuit for the coil of the relay switch 38 after the relay 11 is de-energized to permit the bridging member 29 to return to its normal position.

The field switch 10 is immediately actuated to close its lower contact members against the tension force of a spring 40, whereby the two portions of the shunt field winding are connected in parallel relation to the brushes of the converter commutator. The excitation of the field pole members is thus reversed and the voltage generated at the direct-current end of the converter gradually reduced to zero. The relay switch 38 is thereupon de-energized and the circuit of the operating coil 39 of the field reversing switch 10 is, consequently, opened. The spring 40 is then permitted to actuate the switch 10 to its normal position at which the upper contact members are closed to connect the portions of the field winding in series across the brushes of the commutator. The polarity of the converter will now be developed in the right direction and the polarized relay will actuate the bridging member 29 to engage the contact members 32.

When the field winding switch 10 is actuated to its reversing position, an auxiliary interlock switch 41, that is controlled thereby, is closed to short-circuit the motor and the clutch windings of the polarized relay. The magnetic clutch is released and the movable bridging member 29 returned to its neutral position by the springs 30 and 31. The motor and the clutch windings are short-circuited as a protective feature to preclude the application of potential difference across the terminals thereof.

When the polarity is developed in the right direction, the contact members 32 are engaged by the bridging member 29. A circuit is thereupon completed to connect the operating coil of the transfer relay 24 to the terminals 15 and 16 of the transformer through the master relay switch 18. The transfer relay 24, when energized, opens the switch 23 and closes a switch 42. The switch 23, in opening, de-energizes the operating coil of the starting switch 7 which permits that switch to open, thereby opening the auxiliary switch 26 and closing an auxiliary switch 43. The switch 26, in opening, de-energizes the polarized relay 11. The switch 43, when closed, co-operates with the switch 42, which is closed, to connect the operating coil of the running switch 8 to the terminals 15 and 16 of the transformer through the master relay switch 18 and the auxiliary interlock switch 22 of the main switch 2. Energization of the operating coil of the switch 8 is maintained after the transfer relay 24 is de-energized, by means of the front contacts of the interlock switch 25, which are connected in parallel relation to the switch 42 and are engaged by the bridging member of the interlock switch 25 when the switch 8 is closed.

Full voltage is now supplied to the converter and proper operating voltage is developed at the direct-current end of the converter. When the voltage of the converter, while increasing, equals the voltage of the direct-current circuit 5, a differential voltage relay 44 will permit its switch to close to connect the operating coil of the main direct-current switch 12 to the terminals 15 and 16 of the control transformer, thereby closing the switch 12 to connect the converter to the circuit 5.

I have here shown one method of connecting the converter to the direct-current circuit which is merely indicative of general methods of automatically connecting the converter to the direct-current circuit when proper conditions obtain both in the converter and in the circuit.

The essential feature of my invention is that it permits the application of control apparatus of the described character to synchronous converters of old types which are provided with magnetizable pole members having strongly retentive magnetic characteristics. Were the whole shunt field winding of the converter connected to the commutator in a reversed manner, as a single winding, sufficient reversing force could not be obtained to reverse the incorrect polarity. By dividing the field winding into a plurality of portions, however, and then connecting such portions in parallel relation directly across the commutator brushes, the required reversing force may be obtained to overcome the retentiveness of the field magnet pole members.

Various changes may, of course, be made in the arrangement of the apparatus without departing from the spirit and scope of my invention, as set forth in the appended claims.

I claim as my invention:

1. The combination with a synchronous converter, a direct-current circuit having a predetermined polarity, and means for connecting the converter to the circuit, of means for controlling the development of a potential of predetermined polarity in the converter comprising a shunt field-magnet winding for the converter divided into a plurality of portions, switching means having a normal position in which all of the portions of the converter field-magnet winding are connected in series between the direct-current terminals of the converter to be energized in a predetermined direction, and a reversing position in which all of the portions of the converter field-magnet windings are connected in parallel relation to the direct-current terminals of the converter to be energized in the opposite direction, a polarity-responsive device connected between the direct-current terminals of the converter and having a switch that is closed when the polarity of the converter is opposite to the predetermined polarity of the direct-current circuit, a relay device connected in series with said switch between the direct-current terminals of the converter, and means for actuating the field-magnet winding switching means to the reversing position when said relay device is energized.

2. The combination with an alternating-current circuit and a synchronous converter provided with a shunt field winding, of switching means for connecting the winding to the converter to be energized therefrom in both directions and means controlled by the switching means for connecting the whole winding in series when the winding is energized in one direction and for dividing the winding into a plurality of parallel-connected portions when the winding is energized in the other direction.

3. The combination with an alternating-current circuit and a synchronous converter provided with a shunt field winding, of switching means for connecting the winding to the converter to be energized therefrom in both directions and means for connecting the whole winding in series when the winding is energized in one direction and for dividing the winding into a plurality of parallel-connected portions when the winding is energized in the other direction.

4. The combination with a synchronous converter provided with a shunt field winding and brushes for energizing the winding from the commutator, of electro-magnetic means responsive to the polarity of the converter for controlling the reversing of the connections of the winding to the converter and means for connecting the winding, in one direction of excitation, to constitute a plurality of parallel-connected circuits.

5. The combination with a synchronous converter provided with a shunt field winding and brushes for energizing the winding from the commutator, of switching means between the field winding and the brushes having a normal operating position and a reversing position and operative in the normal position to connect the winding to the converter entirely in series and operative in the reversing position to connect portions of the winding in parallel relation.

6. The combination with a synchronous converter provided with a shunt field winding divided into a plurality of portions, of switching means for controlling the direction of excitation of the winding to control the development of a predetermined polarity and operative in one position to connect all portions of the winding in series and operative in another position to connect the portions of the winding in parallel.

7. The combination with a synchronous converter provided with a shunt field winding divided into a plurality of portions, of switching means operative in one position to connect all of the portions of the field winding in series and operative in another position to connect a plurality of said portions in parallel relation, and means responsive to the polarity of the converter for controlling the switching means.

8. The combination with a synchronous converter provided with a shunt field winding divided into a plurality of portions, of switching means operative in one position to connect all of the portions of the field winding in series and operative in another position to connect a plurality of said portions in parallel relation, and means energized from the direct-current end of the converter for controlling the switching means.

9. The method of bucking down the excitation of the field pole members of a converter to permit slipping a magnetic pole, when the chance polarity developed is other than a predetermined polarity, which consists in connecting several portions of the shunt field winding of the converter in parallel relation while reversing the direction of excitation of the field winding.

In testimony whereof, I have hereunto subscribed my name this 24th day of July, 1922.

AARON D. HOWRY.